United States Patent [19]

Brauer et al.

[11] Patent Number: 5,348,669
[45] Date of Patent: Sep. 20, 1994

[54] CABLE GREASE COMPOSITION AND ARTICLES INCORPORATING SAME

[75] Inventors: Melvin Brauer, E. Brunswick; Yuan C. Chu, East Windsor, both of N.J.

[73] Assignee: CasChem, Inc., Bayonne, N.J.

[21] Appl. No.: 72,649

[22] Filed: Jun. 4, 1993

Related U.S. Application Data

[63] Continuation of Ser. No. 542,388, Jun. 22, 1990, abandoned.

[51] Int. Cl.$^5$ ............... C10M 107/32; C10M 113/10; C10M 113/12; H02G 15/00
[52] U.S. Cl. ........................................ 252/28; 523/173
[58] Field of Search ........................... 252/28; 523/173

[56] References Cited

U.S. PATENT DOCUMENTS

| | | | |
|---|---|---|---|
| 3,903,013 | 9/1975 | Foord et al. | 252/317 |
| 4,331,379 | 5/1982 | Oestreich et al. | 350/96.23 |
| 4,370,023 | 1/1983 | Lange et al. | 350/96.23 |
| 4,411,951 | 10/1983 | Barsotti | 428/328 |
| 4,416,790 | 11/1983 | Schurmann et al. | 252/62 |
| 4,497,918 | 2/1985 | Wason | 523/220 |
| 4,645,298 | 2/1987 | Gartside, III | 350/96.23 |
| 4,695,128 | 9/1987 | Zimmerman et al. | 350/96.23 |
| 4,701,016 | 10/1987 | Gartside, III et al. | 350/96.23 |
| 4,711,523 | 12/1987 | Takashi et al. | 350/96.23 |
| 4,741,684 | 3/1988 | Cornelison et al. | 425/114 |
| 4,744,631 | 5/1988 | Eichenbaum et al. | 350/96.23 |
| 4,757,100 | 7/1988 | Wichelhaus et al. | 523/173 |
| 4,770,489 | 9/1988 | Saito et al. | 350/96.23 |
| 4,786,137 | 11/1988 | Cornelison et al. | 350/96.23 |
| 4,792,422 | 12/1988 | Cornelison et al. | 264/1.5 |
| 4,810,395 | 3/1989 | Levy et al. | 252/28 |
| 4,839,970 | 6/1989 | Goetze et al. | 106/287.1 |
| 4,898,451 | 2/1990 | Story | 350/96.23 |
| 4,921,413 | 5/1990 | Blew | 425/96.23 |

FOREIGN PATENT DOCUMENTS 1435007  5/1976  United Kingdom.

OTHER PUBLICATIONS

E. Braithwaite, "Lubrication and Lubricants,"Elsevier Pub. Co., 1967 pp. 181–183, 223–228 (month unknown).

Primary Examiner—Jerry D. Johnson
Attorney, Agent, or Firm—Pennie & Edmonds

[57] ABSTRACT

A grease composition for use as a cable filling material which contains about 75 to 95 parts by weight of a base component of a polyol or ester having a molecular weight of at least about 3000 and about 2 to 20 parts by weight of colloidal particles such as silica. Optionally, an antioxidant component can be added to impart high temperature resistance or a rubber component can be added to improve bleed resistance. Also, an article of manufacture of a cable having a sheath with one of the grease compositions of the invention located therein, and a method for filling the cable with such grease compositions.

21 Claims, No Drawings

CABLE GREASE COMPOSITION AND ARTICLES INCORPORATING SAME

This is a continuation of application Ser. No. 07/542,388, filed Jun. 22, 1990, now abandoned.

TECHNICAL FIELD

The present invention relates to a colloidal particle filled polyol base component grease composition and to articles such as sheathed communication cables, especially those containing optical fiber bundles, which include this grease composition therein.

BACKGROUND OF THE INVENTION

A grease typically is a solid or semi liquid substance which includes a thickening or gelling agent in a liquid carrier. Almost any oil having lubricating properties may be used with a suitable gelling agent to make a grease. Petroleum oils, fatty oils such as castor oil, polyalkylene glycols, synthetic diesters, silicones, fluorocarbons and polyphenyl ethers are all found in commercial lubricating greases. (See, e.g., Braithwaite, "Lubrication and Lubricants," Elsevier Publishing Co., 1967, pages 181–183 and 223–228). The gelling agent frequently used in greases include fatty acid soaps, clays, silica, organic dyes, amides, and urea derivatives. The gelling agent forms a network structure in which the carrier is held by capillary forces.

When a low stress is applied through a sample of grease, the material acts substantially like a solid. If a stress above a critical value is supplied, the material flows and viscosity decreases rapidly. This decrease in viscosity is largely reversible since it is typically caused by the rupture of network junctions between filler particles, and these junctions can reform following the removal of the source of the stress.

A desirable property of the grease is the absence of syneresis, i.e., its ability to maintain uniform consistency. Generally, syneresis is controlled by assuring dispersion of an adequate amount of the gelling agent throughout the composition.

Grease compositions have been used as cable filling material is both conventional (electrical) communications as well as for optical fiber cables. U.S. Pat. No. 4,701,016 discloses a grease compositions comprising an oil, a gelling agent such as colloidal particles of silica or clay, and optionally a bleed inhibitor. The oils which are disclosed as being useful in a compositions of the patent include certain naphthenic or paraffinic oils having certain specific gravities and properties, polybutene oils of similar specific properties, triglyceride based vegetable oils, polypropylene oil, chlorinated paraffin oils, and polymerized esters. The colloidal particle filler material preferably comprises silica particles such as fumed silica or precipitated silica. Preferred bleed inhibitors include styrene-rubber, styrene-rubber-styrene, or other block polymers, and/or semi liquid rubbers such as high viscosity polyisobutylene. Other ingredients such as thermal oxidative stabilizers may optionally be present.

One disadvantage of the compositions of the above cited patent is that relatively large amounts of silica must be included to meet the appropriate service requirements for the grease. Thus, relatively stiff greases are obtained which are not entirely suitable for such fiber optic cables. In particular, such stiff greases will affect attenuation (microbending) of the fiber optic cable at relatively low temperatures (i.e., below about 50° F.). Furthermore, if the amount of silica is reduced to lower the viscosity of the grease, the shear characteristics of the formulation are reduced to a value which is less than desirable. Moreover, such a reduction in silica often results in syneresis.

Accordingly, there is disclosed herein novel polyol containing grease compositions which are capable of providing an optimum balance of viscosity and shearing characteristics such that the compositions are entirely suitable for use with fiber optic cables even at lower temperatures. In addition, these formulations provide properties which are capable of passing the appropriate drip tests, paper bleeding tests, and syneresis requirements for such cable filling greases.

SUMMARY OF THE INVENTION

The present invention relates to a grease composition for use as a cable filling material, comprising between about 75 and 95 parts by weight of a base component of a polyol, preferably of a polyether, polyester or hydrocarbon type, having a molecular weight of at least about 3,000 and between about 2 and 20 parts by weight of colloidal particles. The colloidal particles, which preferably include silica, clay or mixtures thereof, maybe present in an amount of between about 4 to 15 parts by weight, preferably 6 to 12 parts by weight and most preferably between 7 and 11 parts by weight.

The base component includes wide varieties of polyols which have a molecular weight of at least about 3,000 up to as high as about 8,000. The preferred amount of polyol or ester to be used in these compositions ranges between 80 and 95 parts by weight. The preferred polyols include any polyoxypropylene glycol, diol, triol, tetrol etc., any polytetramethylene glycol as well as polybutadiene or other hydrocarbon polyols. Regarding the suitable polyesters for use in the present invention, included are esters derived from carboxylic acids, wherein the ester is liquid at ambient temperature, has a hydroxyl functionality of at least 2, and a molecular weight in the range recited above.

The composition may also include between 0.5 and 5 parts by weight of an antioxidant to improve the high temperature properties of the grease composition. A preferred antioxidant, Irganox 245, is used in an amount of about 1 to 3 parts by weight.

The composition may also include a rubber component in the amount effective to act as a bleed inhibitor but in an amount less than 15 parts by weight. Many different rubber components such as butyl rubber, ethylene propylene rubber, ethylene propylene dimer rubber, chlorinated rubber or other thermoplastic/rubber block copolymers could be used.

DETAILED DESCRIPTION OF THE INVENTION

Polyol containing grease compositions of the present invention are ideally suited for use in connection with the filling of optical fiber cable, such as those disclosed in U.S. Pat. Nos. 4,645,298, 4,701,016, 4,711,523 and 4,744,631. To the extent necessary to understand the structure of such cables, these patents are expressly incorporated herein by reference thereto.

The present composition comprises at least two major components, namely, (1) a polyol having at a molecular weight of at least 3,000 and (2) colloidal particles. If desired, although not necessary for the invention, a bleed inhibitor of a rubber polymer can be added to the previously described components. Also, an antioxidant can be used to improve the high temperature properties of the formulation. The preferred polyols of the invention include any polyether polyol including polyoxypropylene glycol or polytetramethylene glycol, diol, triol, tetrol, etc. as well as any other hydroxyl terminated polyethers having the appropriate molecular weight. It is also possible to use polybutadiene diols, triols, or tetrols or other similar hydrocarbon polyols. These materials may be used alone or in combination depending upon the specific results desired. Polyester polyols can also be used, including hydroxy terminated vegetable oils or other hydroxy bearing unsaturated triglycerides, again provided that these components are polymerized to the desired molecular weight of at least 3000. One particularly preferred example of this type polyol is polymerized castor oil.

The base component which may be used according to this invention also includes polymerized esters of carboxylic acids. These esters are liquids at ambient temperature and have a hydroxyl functionality of at least 2. Hydroxyl functionality as used herein is the average number of hydroxyl groups per molecule of ester compound. As noted above, a specific molecular weight of the overall hydroxy functional base component is necessary to achieve the desired results of the invention, and this is obtained by polymerization or esterification of the bifunction acid and a polyol at the appropriate mole ratios as known in the art.

The base component of the invention may also include polyhydric alcohols having a hydroxy functionality of 2 or more and a molecular weight of between about 3000 and 8000. Such compounds include various di, tri, and hydroxy bearing compounds alone, mixed together, or combined with other polyols provided that the molecular weight of the mixture or combination is maintained within the range stated above.

Castor oil is a naturally occurring trigylceride of ricinoleic acid. Castor oil is actually a mixture of mono-, di-, and triglycerides and has an average hydroxyl functionality of 2.7. Other ricinoleic acid polyolesters include glycol, polyglycol and other polyhydric alcohol mono-, di-, and polyesters of ricinoleic acid. These ricinoleic acid polyol esters can be made by methods well known in the art, e.g., by direct esterification of ricinoleic acid with alcohols such as ethylene glycol, glycerine, propylene glycol, hexylene glycol, diethylene glycol, dipropylene glycol, hexamethylene glycol, polyethylene and polypropylene glycols, sucrose or sorbitol.

Specific ricinoleate ester compounds include ethylene glycol mono-, di-ricinoleates, propyl mono- and diricinoleates, penta erythritol mono-, di, tri, tetra- and penta-ricinoleates, glycerol ricinoleate, 1,4-cyclohexane dimethanol mono- and di-ricinoleates, butane diol diricinoleate, neopentyl glycol mono- and di-ricinoleates, and mono- or di-ricinoleates of N,N-bis (2-hydroxy propyl) aniline or N,N,N',N'-tetrakis (2-hydroxy propyl) ethylene diamine.

Castor oil and the other ricinoleate esters may be used provided that they are polymerized to the appropriate molecular weight range of 3000–8000. Additional hydroxyl bearing components which are suitable in the compositions of this invention include one or more polyether polyols having a molecular weight of at least 3000 up to about 8000.

The preferred polyether polyols are polyether diols, and more particular polyoxypropylene diols. Generally, these polyether diols are prepared by condensing a large excess of an alkylene oxide, such as ethylene oxide or propylene oxide with a glycol, as is well known in the art. The glycol can be a diol, such as the alkylene glycols, e.g., ethylene or propylene glycol, or an ether glycol, such as diethylene glycol.

Polyols such as PPG Niax PPG-4025 and PPG-3025, Pluracol 1040 and the like are preferred. These have molecular weights of approximately 3,000 or more.

As noted above polymerized castor oil having a molecular weight of at least 3,000 is one material which may be suitable according to the present invention. However, polypropylene glycols having a molecular weight of about 3,000 to 4,000 are the most preferred materials.

Among the colloidal particles useful in the practice of the invention is colloidal silica, either hydrophilic or hydrophobic, preferably a hydrophobic fumed silica having a BET surface area between about 50 and about 40 $m^2/gm$. An example of a hydrophobic fumed silica useful in the practice of the invention is a polydimethylsiloxane-coated fumed silica having a BET surface area of about 80–120 $m^2/gm$, containing about 5% b.w. carbon, available from the Cabot Corporation of Tuscola, Ill., under the trade designation Cab-O-Sil TS 720. An exemplary hydrophlic colloidal material is fumed silica with a BET surface area of about 175–225 $m^2/gm$, nominal particled size 0.012 $\mu m$, specific gravity 2.2, available from the Cabot Corporation under the trade designation Cab-O-Sil M-5. Mixtures of these materials may also be used. Other colloidal fillers useful in the practice of the invention are precipitated silicas and clays such as bentonites, with or without surface treatment.

Among the rubber block copolymers that in the compositions according to the invention are styrene-rubber and styrene-rubber-styrene block copolymers having a styrene/rubber ratio between approximately 0.1 and 0.8. Exemplary block rubbers are (a) styrene-ethylene propylene block copolymers (SEP) having a styrene/rubber ratio of about 0.59, an unplasticized, specific gravity about 0.93, and a break strength (ASTM D-412) 300 psi, available from Shell Chemical Company of Houston, Tex., under the trade designation Kraton G 1701; (b) a styrene-ethylene butylene block copolymer (SEB), having a styrene/rubber ratio of about 0.41, obtained from Shell Chemical Company under the designation TRW-7-1511; (c) a styrene-ethylene butylene-styrene block copolymer (SEBS), having a styrene/rubber ratio about 0.16, an unplasticized, specific gravity of about 0.90, 750% elongation, 300% modulus (ASTM D-412) 350 psi, available from Shell Chemical Corporation under the trade designation Kraton G 1657. Other styrene-rubber or styrene-rubber-styrene block copolymers expected to be useful in the practice of the invention are styrene-isoprene rubber (SI) and styrene-isoprene-styrene (SIS) rubber, styrene-butadiene (SB) and styrene-butadiene-styrene (SBS) rubber. An example of SIS is Kraton D 1107, and an example of SBS is Kraton D 1102, both available from Shell Chemical Company.

Among the semi-liquid rubbers that may optionally be used as bleed inhibitors in the practice of the invention are high viscosity polyisobutylenes having a Flory molecular weight between about 20,000 and 70,000. Exemplary thereof is a polyisobutylene having a Flory molecular weight of about 42,600–46,100, a specific gravity of about 0.91 and a Brookfield viscosity of 350° F. (about 177° C.) of about 26,000–35,000 cps, available from Exxon Chemical Company of Houston, Tex. under the trade designation Vistanex LM-MS. Other rubbers which are considered to be useful in the practice of the invention are butyl rubber, ethylene propylene, ethylenepropylene dimer rubber (EPDM), and chlorinated butyl rubber having a Mooney viscosity, ML 1+8 at 100° C. (ASTM D-1646) of between about 20 and 90. Examples of the above are Butyl 077, Vistalon 404, Vistalon 3708 and Chlorobutyl 1066, respectively, all available form Exxon Chemical Company. Also useful are depolymerized rubbers having a viscosity at 38° C. of between about 40,000 and 400,000 cps. An example thereof is DPR 75 from Hardman, Inc. of Belleville, N.J. All these bleed inhibitors are considered optional additives to the composition of the present invention.

By following the combination of ingredients disclosed above, the grease of the present invention is characterized as being non-dripping with high penetration and a low yield stress. The high penetration capabilities as a grease allows a better fluidity, that is, lower viscosities may be used so that the cable may be more easily filled with the grease. Furthermore, the present invention provides three distinct advantages over prior art formulations:

1) the processing properties as noted above are exceptional in that the material can thin out as much as possible under heat and shear for easy cable filling. Thus, the grease of the invention fills the cable more easily and faster and thus avoids microbending difficulties which can cause attentuation in fiber optic cable.

2) Conventional formulations at low viscosity require a reduced silica content to achieve the same degree of viscosity. However, this reduction causes syneresis, i.e. the gel becomes unstable and separates into an oil layer and a filler layer. This separation causes difficulties in the static properties of the fiber optic cable. The formulations of the present invention have not exhibited syneresis in any tests conducted so far.

When introducing the grease into the fiber optic cable it is important to achieve as low a viscosity as possible so that the fibers would not be moved. This is achieved by introducing the grease under high shear into the cable. The grease composition is retained in a reservoir or drum upon which a drum pump of the piston type is attached. This pump causes low shear and movement of the grease out of the drum and into a conduit or pipe which is traced and heated to maintain the temperature of the grease therein at least about 80° C. The grease is then directed through a gear pump which is operated under high shear conditions from about 5,000 to as high as 20,000 revolutions per sec. The pipe exiting the gear pump directs the grease into a die which is positioned about the fiber optic cable in a manner such that the grease is extruded into the cable around the fibers. The grease is extruded into the cable at temperatures of about 500° to 600° F., preferably at about 550° F. Unlike prior art greases, the formulations of the invention are somewhat stable at that temperature.

As noted above, an antioxidant may be used to impart enhanced stability to the grease at such elevated extruding temperatures. The most preferred antioxidant is Ciba-Geigy Irganox 245, a sterically hindered phenolic compound in the form of a white crystalline powder having the empirical formula $C_{34}H_{50}O_8$. This compound is also known as triethylene glycol bis [3-(3'-tert-butyl-4'-hydroxy-5'-methylphenyl) propionate] or ethylene bis (oxyethylene) bis (3-tert-butyl-4-hydroxy-5-methyl hydro cinnamate). Other bis hindered phenol rings connected by a polyether linkage should provide comparable results, but the Irganox 245 is preferred due to its ready commercial availability.

To determine whether or not a particular antioxidant is suitable for use in the present invention, a Belcore oxygen inhibition test may be conducted. A sample of the grease is put in a calorimeter in a boat under nitrogen pressure and is conditioned at 190° C. Thereafter, pure oxygen is pumped into the calorimeter and changes in the grease are measured. In order to provide a suitable grease, the rest of the material must be able to withstand approximately 10 minutes at 190° C. with a pure oxygen environment. The use of 1% by weight of Irganox 245 in the grease formulations of the present invention allows the grease to have an oxidative induction time of approximately 8 minutes in the Belcore test. Increasing that level to about 2% increases oxidative induction time to about 12 minutes. Finally, a 3% addition of Irganox 245 to the greases of the present invention provides a 30 minute oxidative induction time rating in the previously described test: this is an optimum condition which is quite unexpected for these types of materials.

Thus, the compositions of the present invention are capable of passing the appropriate tests for obtaining suitable grease compositions for filling fiber optic cable. These tests include a syneresis observation, wherein the present invention exhibits no separation, an 80° C. drip test, and a bleeding test utilizing a 0.1 millimeter penetrant at 25° C.

The syneresis observation is conducted as follows: the formulations are prepared, retained in a suitable container, and observed for oil separation over a period of one month. The most preferred formulations are those which exhibit no syneresis over a period of at least six months, since it is unlikely that any syneresis will be encountered for longer times of use of the grease.

The 80° C. drip test is described as follows:
1. Use a 12 inch long buffer tube;
2. Insert three 12 inch long optical fibers into the tube;
3. Fill the tube with the grease to be tested by injecting the sample using a 5 cc syringe. No air should be trapped in the tube;
4. Place the tube in a horizontal position for 2 hours at room temperature;
5. Place the tube in a horizontal position for 2 hours at 80° C. (A forced air oven is preferably used);
6. Clean any amount of grease that comes out of the tips of the tube due to thermal expansion;
7. Weigh a clean, empty aluminum dish in grams (W1);
8. Place the tube in a vertical position at 80° C.;
9. Place the aluminum dish under the tube in such a way that the tip of the tube is a few millimeters from the center of the bottom of the dish;
10. Leave the system at 80° C. for 24 hours;
11. Reweigh the aluminum dish in grams (W2). Inspect the dish for any traces of liquid;
12. The difference in weight (W2-W1) is the dripping reading in grams.

The paper bleeding test is described as follows:

MATERIALS 1. 5 ml syringe
2. 11 cm diameter, type 1 filter paper
3. Pyrex watchglass (12 cm diameter)
4. 600 ml Pyrex beaker 5. Lab spatula
6. Analytical balance
7. Tweezers
8. Scissors
9. Forced draft oven set to 80° C.

PROCEDURE

1. Load the grease compound into the syringe with a spatula. Slowly press the plunger to eliminate air bubbles.
2. Cut a 1 in by 1 in. filter paper square; weight (WT 1) and record (to 0.0001 grams).
3. Slowly apply 1 ml of the compound from the syringe onto the filter paper square in a circular dab. (Leave some room around the edges to allow the dab to spread.) Weigh this "sample square" and record this value as WT 2.
4. Weigh an 11 cm diameter filter paper circle (WT 3), and place it on the watchglass. Put the "sample square" on the center of the filter paper, and cover with a 600 ml beaker.
5. Let the sample lie undisturbed at room temperature for 16 hours.
6. Weigh the sample square (WT 2A) and the large filter paper circle (WT 3A).
7. Replace the sample square under the beaker, and place the entire assembly in the oven. Do not disturb for 24 hours.
8. Remove from the oven and allow to cool for 5 minutes on a marble surface. Weigh the sample square (WT 2B) and the filter paper circle (WT 3B). Note any color changes.
9. Discard sample square and filter paper.
10. When handling the sample square and the filter paper circle, use only tweezers. Take care to keep moisture and all foreign particles away from the sample square.

CALCULATIONS

1. Initial Weight=(WT 2)−(WT 1)
2. Weight Loss=(WT 2)−(WT 2A or WT 2B)
3. % Weight Loss=Weight Loss×100/Initial Weight
4. Filter Paper Weight Gain=(WT 3A or WT 3B)−(WT 3)
5. Volatile Weight
  a. (Weight Loss)−(Filter Paper Weight Gain) if >0 or
  b. 0, if (Weight Loss)−(Filter Paper Weight Gain) ≦0
6. % Volatile Weight=Volatile Weight×100/Initial Weight
7. % Nonvolatile Separation=% Weight Loss−% Volatile Weight "A" values are used to calculate weight change after 16 hours at room temperature. "B" values are used to determine weight change after the additional 24 hours at 80° C.

MEASUREMENT ERROR

Due to repeated handling of the sample, some error should be expected, especially in calculating volatile weight loss at room temperature. All weights should be recorded to the nearest 0.0001 gram. All calculated results should be reported to the nearest whole number. At least three samples should be tested simultaneously per compound to be evaluated. The resulting percentage values can then be averaged to determine the % Weight Loss and % Nonvolatile Separation. These tests were used to determine the performance of various grease formulations according to the invention.

EXAMPLES

The scope of the invention is further described in connection with the following examples which are set forth for the sole purpose of illustrating the preferred embodiments of the invention and which are not to be construed as limiting the scope of the invention in any manner. In these examples all parts given are by weight unless otherwise specified.

EXAMPLES 1–5 (COMPARATIVE)

The number of formulations using hydrocarbon oils have been prepared as representative of the prior art. Examples 1–4 are greases based on hydrocarbon oil, specifically, the polyalpha olefin oil as known as PAOL.

Examples 1 and 2 compare the properties of the grease with different penetration (i.e., 310 vs. 390). Higher penetration showed worse bleeding and dripping.

Examples 2–4 compare the properties with different oil viscosities. Generally, higher viscosity improves the bleeding, but the grease still failed the dripping tests with too high bleeding, while Example 3 failed with too high dripping. Example 2 failed both tests.

Examples 1–4 all failed one of bleeding or dripping, and/or syneresis.

From these examples, it was concluded that PAOLs (hydrocarbon oils or petroleum based oils) are unsuitable because they fail syneresis and dripping in general.

EXAMPLES 6–11

These examples are representative formulations of the present invention.

Examples 6–11 are greases based on polypropyleneoxy glycols (PPGs) of various molecular weight and functionality.

Examples 6–7 failed with too high bleeding and/or dripping. These examples indicate that the minimum acceptable molecular weight should be about 3000. Higher molecular weight will easily pass the bleeding and dripping tests, but may be too thick to be practically processed. Thus, a molecular weight range of about 3000 to 8000 is preferred.

Example 8 compares the effect of utilizing PPG to replace PAOL (hydrocarbon) at same viscosity level (example 3). A significant improvement in bleeding (50%), dripping and syneresis resulted. The grease of example 8 with PPG passed both bleeding, dripping and syneresis, while the PAOL grease failed both syneresis and dripping.

The effect of functionality is not clear: however, Examples 6 and 7 showed that no significant improvement was observed by increasing functionality from 2 to 3. The same can be observed by comparing Examples 8 and 9.

Examples 2 and 6 compare the low viscosity greases made with hydrocarbon to that with PPG. Improvement on bleeding and dripping tests resulted by replacing the hydrocarbon with the PPG. Thus, PPG surprisingly improved grease performance and made nonsyneresis possible.

Examples 3 and 8 were compared with 5 and 11, respectively. For the hydrocarbon grease, the M5 silica improved syneresis and bleeding, but made the dripping worse. For the PPG grease, the M5 silica improved the bleeding while the dripping performance was retained. Thus, the M5 silica improves bleeding and syneresis but not the dripping.

ples exhibited any oil separation (syneresis), thus indicating their suitability for providing long service lives.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

TABLE 1

| EXAMPLES | 1 | 2 | 3 | 4 | 5 | 6 | 7 | 8 | 9 | 10 | 11 |
|---|---|---|---|---|---|---|---|---|---|---|---|
| CAB-O-SIL | TS720 | TS720 | TS720 | TS720 | TS720/M5 | TS720 | TS720 | TS720 | TS720 | TS720 | TS720/M5 |
| VISCOSITY OF BASE COMPONENT (cps) | 100 | 100 | 800 | 4000 | 200 | 220 | 800 | — | 1400 | 800 | 800 |
| TYPE OF COMPONENT | HYDROCARBON | HYDROCARBON | HYDROCARBON | HYDROCARBON | HYDROCARBON | PPG | PPG | PPG | PPG | PPG | PPG |
| MOL. WT OF BASE COMPONENT | — | — | — | — | — | 1000 | 2000 | 4000 | 3000 | 6700 | 4000 |
| FUNCTIONALITY | — | — | — | — | — | 3 | 2 | 2 | 3 | — | 2 |
| WT. % OF BASE COMPONENT | 87 | 89.5 | 91 | 92 | 87 | 91 | 90.5 | 90 | 89 | 91.5 | 90 |
| WT. % CAB-O-SIL TS720 | 11 | 8.5 | 7 | 5 | 5.5 | 7 | 7.5 | 8 | 9 | 6.5 | 4 |
| WT. % CAB-O-SIL M5 | — | — | — | — | 5.5 | — | — | — | — | — | 4 |
| WT. % ANTIOXIDANT | 2 | 2 | 2 | 3 | 2 | 2 | 2 | 2 | 2 | 2 | 2 |
| PENETRATION @ 25 C. (0.1 mm) | 310 | 390 | 390 | 380 | 300 | 400 | 396 | 370 | 380 | 370 | 389 |
| PAPER BLEEDING @ 80 C. | 20 | 29 | 12 | 12 | 5 | 14 | 22 | 6 | 7 | 7 | 1.2 |
| DRIPPING @ 80 c. (g) | 0.03 | 1.05 | 0.01 | 0.34 | 0.17 | 0.14 | 0 | 0 | 0.00 | 0.00 | 0.00 |
| SYNERESIS, 1 MONTH | YES | YES | YES | NO | YES | NO | NO | NO | NO | NO | NO |

NOTES:
Passing criteria for bleeding: less than 15%, preferably less than 10.
for dripping: less than 0.01, preferably zero.
for syneresis: None (no)

TABLE 2
GREASES WITH BASE OIL CONTAINING ACTIVE HYDROGENS

| EXAMPLES | 12 | 13 | 14 |
|---|---|---|---|
| CAB-O-SIL | TS720 | TS720 | TS720/M5 |
| Base Oil Type | Hydrocarbon | Polyol[1] | Polyol/PPG[2] |
| Viscosity of Base Component (cps) | 4000 | 5000 | 2700 |
| Molecular Weight | — | 2500 | — |
| Wt. Base Component | 92 | 92 | 92 |
| Wt. % CAB-O-SIL M5 | | | |
| Wt. % CAB-O-SIL TS720 | 5 | 6 | 6 |
| Wt. % Antioxidant | 3 | 2 | 2 |
| Penetration @ 25 C. (0.1 mm) | 380 | 375 | 390 |
| Dripping @ 80 C. (g) | 0.34 | 0 | 0 |
| Syneresis (1 mo.) | Yes | No | No |

[1] Polyol is Poly BD R45HT by Arco Chemical.
[2] 50 parts of Polyol BD R45 HT with 50 parts of PPG (4000 MW).

EXAMPLES 12-14

Example 12 is representative of the prior art whereas Examples 13 and 14 are representative of the grease compositions of the present invention.

At the same viscosity level, the polybutadiene diol showed improvement in bleeding, dripping and syneresis: Example 13 passed all tests. Also, a blend of PPG/Polyol (Example 14) does not effect the performance of polybutadiene as long as the PPG falls in the molecular weight range described in Table 1, i.e. one having a molecular weight higher than 3000.

EXAMPLE 15

The syneresis observation for Examples 6-10 and 13-14 was conducted for an extended time. After a six month period, none of the formulations of these exam-

What is claimed is:

1. A cable filling material of a grease composition consisting essentially of about 75 to 95 parts by weight of a polyol comprising a polybutadiene diol, triol or tetrol and having a molecular weight of at least about 3000; and about 2 to 15 parts by weight of colloidal particles of silica, clay or mixtures thereof.

2. The composition of claim 1 wherein the colloidal particles are hydrophobic fumed silica, precipitated silica, clay or mixtures thereof.

3. The composition of claim 1 wherein the colloidal particles are present in an amount of at least about 4 parts by weight.

4. The composition of claim 1 further consisting essentially of a rubber component in an amount of up to about 15 parts by weight.

5. The composition of claim 4 wherein the rubber component is butyl rubber, ethylene propylene rubber, ethylene propylene dimer rubber, chlorinated rubber or a thermoplastic/rubber block copolymer.

6. The composition of claim 1 further consisting essentially of an antioxidant in an amount of between about 0.5 and 5 parts by weight.

7. A cable filling material of a grease composition consisting essentially of about 75 to 95 parts by weight of a polyester polyol having a hydroxy functionality of at least 2 and a molecular weight of at least about 3000; and about 2 to 15 parts by weight of colloidal particles of silica, clay or mixtures thereof.

8. The composition of claim 7 wherein the polyester polyol is an esterification product of a polyol with a polycarboxylic acid or a polymerized hydroxy terminated vegetable oil.

9. The composition of claim 7 wherein the polyester polyol is a polymerized ester of a carboxylic acid having at least 8 carbon atoms which is a liquid at ambient temperature, a recinoleate ester, or polymerized castor oil.

10. The composition of claim 7 wherein the colloidal particles are hydrophobic fumed silica, precipitated silica, clay or mixtures thereof, and are present in an amount of at least 4 parts by weight.

11. The composition of claim 7 further consisting essentially of rubber component in an amount of up to about 15 parts by weight.

12. The composition of claim 11 wherein the rubber component is butyl rubber, ethylene propylene rubber, ethylene propylene dimer rubber, chlorinated rubber or a thermoplastic/rubber block copolymer.

13. The composition of claim 7 further consisting essentially of an antioxidant in an amount of between about 0.5 and 5 parts by weight.

14. A cable filling material of a grease composition consisting essentially of about 75 to 95 parts by weight of a polyol having a hydroxy functionality of at least 2 and a molecular weight of at least about 3000; about 2 to 15 parts by weight of colloidal particles of silica, clay or mixtures thereof; and about 2 to about 5 parts by weight of an antioxidant of a sterically hindered phenolic compound so that the composition has an oxidative induction time of at least about 10 minutes at 190° C. in a pure oxygen environment.

15. The composition of claim 14 wherein the antioxidant is present in an amount of at least about 3 parts by weight so hat the composition has an oxidative induction time of at least about 30 minutes at 190° C. in a pure oxygen environment.

16. The composition of claim 14 wherein the antioxidant is triethylene glycol bis [3-(3'-tert-butyl-4'-hydroxy-5'-methyl phenyl) propionate].

17. The composition of claim 14 wherein the colloidal particles are hydrophobic fumed silica, precipitated silica, clay or mixtures thereof.

18. The composition of claim 14 wherein the colloidal particles are present in an amount of at least about 4 parts by weight.

19. The composition of claim 14 wherein the polyol is a polyether polyol, a polyester polyol or a hydrocarbon polyol.

20. The composition of claim 14 further consisting essentially of a rubber component in an amount of up to about 15 parts by weight.

21. The composition of claim 14 wherein the polyol is a polymerized ester of a carboxylic acid having at least 8 carbon atoms which is a liquid at ambient temperature.

* * * * *